United States Patent [19]

Adams

[11] 3,957,233

[45] May 18, 1976

[54] FLUIDICALLY CONTROLLED CARGO HOOK CONTROLLED SYSTEM

[75] Inventor: David Orin Adams, Cape Neddick, Maine

[73] Assignee: United Technologies Corporation, Hartford, Conn.

[22] Filed: July 21, 1975

[21] Appl. No.: 597,628

[52] U.S. Cl. .......................... 244/137 R; 137/819; 294/83 R
[51] Int. Cl.² .......................................... B64D 9/00
[58] Field of Search ............... 294/83 R, 88, 83 AB, 294/66, 86.15, 110; 244/137 R; 137/804, 819, 820, 821

[56] References Cited
UNITED STATES PATENTS

| | | | |
|---|---|---|---|
| 2,868,580 | 1/1959 | Stevens et al. | 294/83 AB |
| 3,032,365 | 3/1962 | Campbell | 294/83 AB |
| 3,401,974 | 9/1968 | Martelee | 294/110 |
| 3,504,406 | 4/1970 | Schott | 294/83 R |
| 3,565,114 | 2/1971 | Rousseau | 137/819 |
| 3,614,963 | 10/1971 | Matteson | 137/819 |
| 3,630,023 | 12/1971 | Lazar et al. | 137/819 |
| 3,695,671 | 10/1972 | Fishel | 294/88 |
| 3,704,720 | 12/1972 | Kaiser | 137/819 |
| 3,845,978 | 11/1974 | Huber | 294/83 AB |

*Primary Examiner*—Trygve M. Blix
*Assistant Examiner*—Galen L. Barefoot
*Attorney, Agent, or Firm*—Vernon F. Hauschild

[57] ABSTRACT

A fluidically controlled cargo hook control system for use with aircraft including a fluidic circuit actuatable so that the cargo hook can be opened at pilot command during the pilot command mode of operation, so that the cargo hook will automatically open upon cargo touch-down during the automatic touch-down mode of operation, so that the pilot may override the automatic touch-down system to open the cargo hook at his command during the automatic touch-down mode of operation, and so that the entire fluidic system can be placed in the safe-mode condition so that neither automatic touch-down input nor pilot input can open the cargo hook.

9 Claims, 14 Drawing Figures

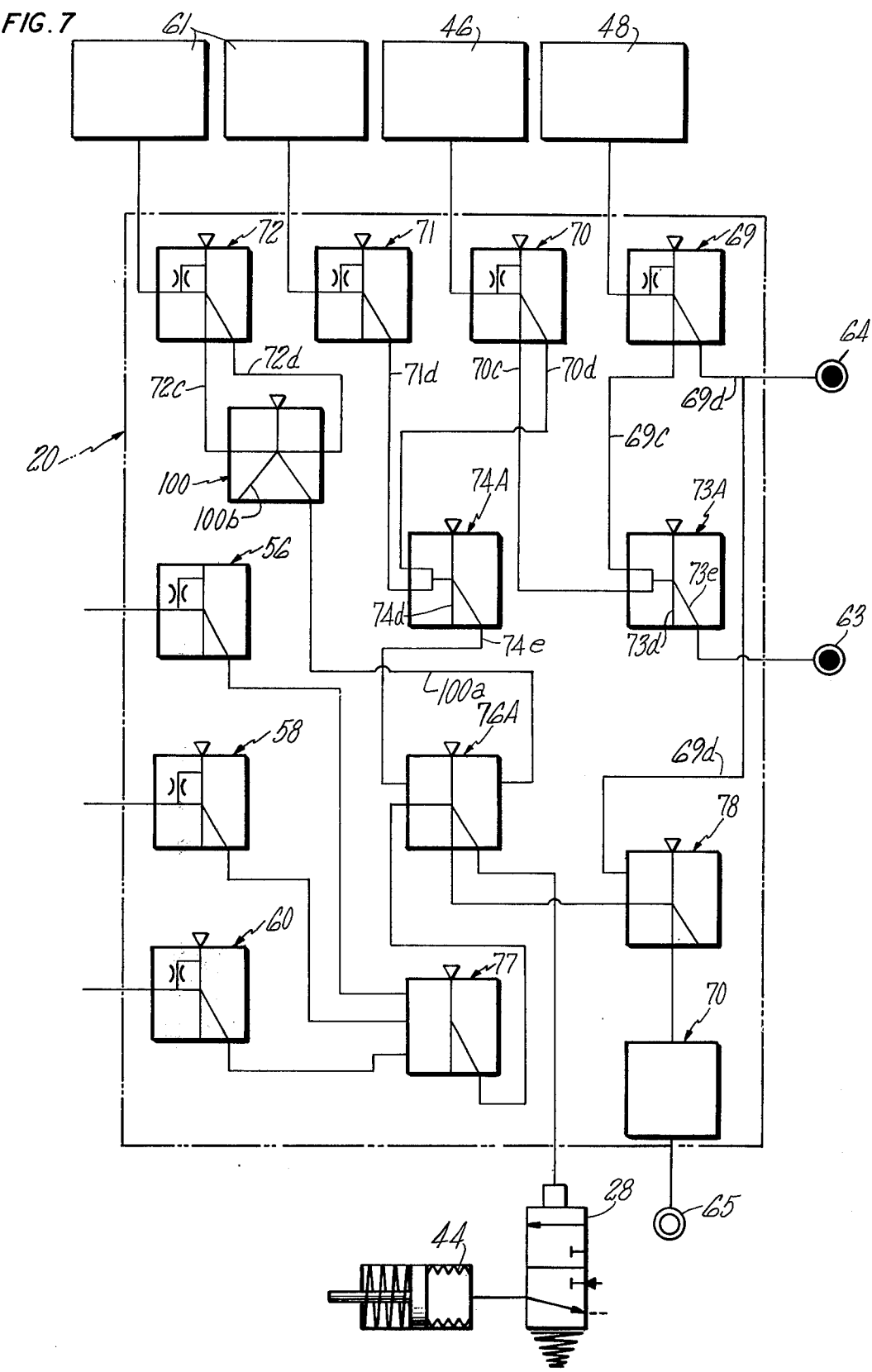

FLUIDICALLY CONTROLLED CARGO HOOK CONTROLLED SYSTEM

BACKGROUND OF THE INVENTION

1. Field of Invention

This invention relates to the control of a cargo being carried on a cargo hook supported from an aircraft and more particularly to the control of such system which is fluidic in nature.

2. Description of the Prior Art

In the past, cargo hooks for aircraft have been controlled by electrical or electronic means. The electrical prior art control means has disadvantages in that it generally requires the presence of electrical microswitches in the hook and these electroswitches often fail due to extreme environment at the hook which is subjected to sand, dust, water and rough handling. The electrical system has the further disadvantage that electrical wires must extend through the hook carrying cable and these wires are often broken or shorted when the cable is subjected to extremes of loading and/or deflection. Other problems have been encountered in the necessary relays, switches and slip rings of the electrical prior art system.

SUMMARY OF THE INVENTION

A primary object of the present invention is to provide a fluidically controlled, pneumatically actuated cargo hook control system for use with aircraft which is inherently reliable, rugged and virtually immune to environment problems.

In accordance with the present invention, a fluidic cargo hook control system is provided which has no moving parts in the fluidic control portion, which is preferably integrated, and which has the advantages of simplicity, lightweight, low cost and low maintenance requirements.

The invention permits fluidic control of the pneumatic power to operate the cargo hook from the aircraft so that, during the pilot command mode of operation the pilot may open the cargo hook and release the cargo at his command, so that during automatic touch-down mode of operation the cargo is automatically released upon touch-down of the cargo to the ground, and wherein the pilot can override the dictates of the fluidic control when in the auto touch-down mode so as to release the cargo at the command of the pilot.

This fluidic control system has provisions for placing the system in a safe mode of operation so that neither the usual release input thereto by the pilot nor the automatic touch-down mechanism is capable of releasing the cargo.

It is a further feature of this fluidic circuit that it is integrated, contains no long fluid lines between switches and employs a system wherein the circuit is normally pressurized and lines are instantaneously bled by a control signal. The two long sensing lines between the hook and the circuit are always pressurized thereby constantly giving indication of hook conditions regardless of mode of operation.

In accordance with the fluidic system taught herein, a selected time delay is incorporated to provide proper and safe operation of the system.

It is a further feature of this system that, in the event of failure of the cargo hook to fully open for any reason within a preset short time of release initiation by either pilot command or automatic touch-down command, an indication of "Release Malfunction" is presented on the control panel.

BRIEF DESCRIPTION OF THE DRAWING

FIG. 1a is a schematic showing of the cargo hook cable.

FIG. 7 is a showing of a modification of the fluidic control circuit illustrating the use of both "or-nor" and "and" fluidic devices.

DESCRIPTION OF THE PREFERRED EMBODIMENT

Figure 1:
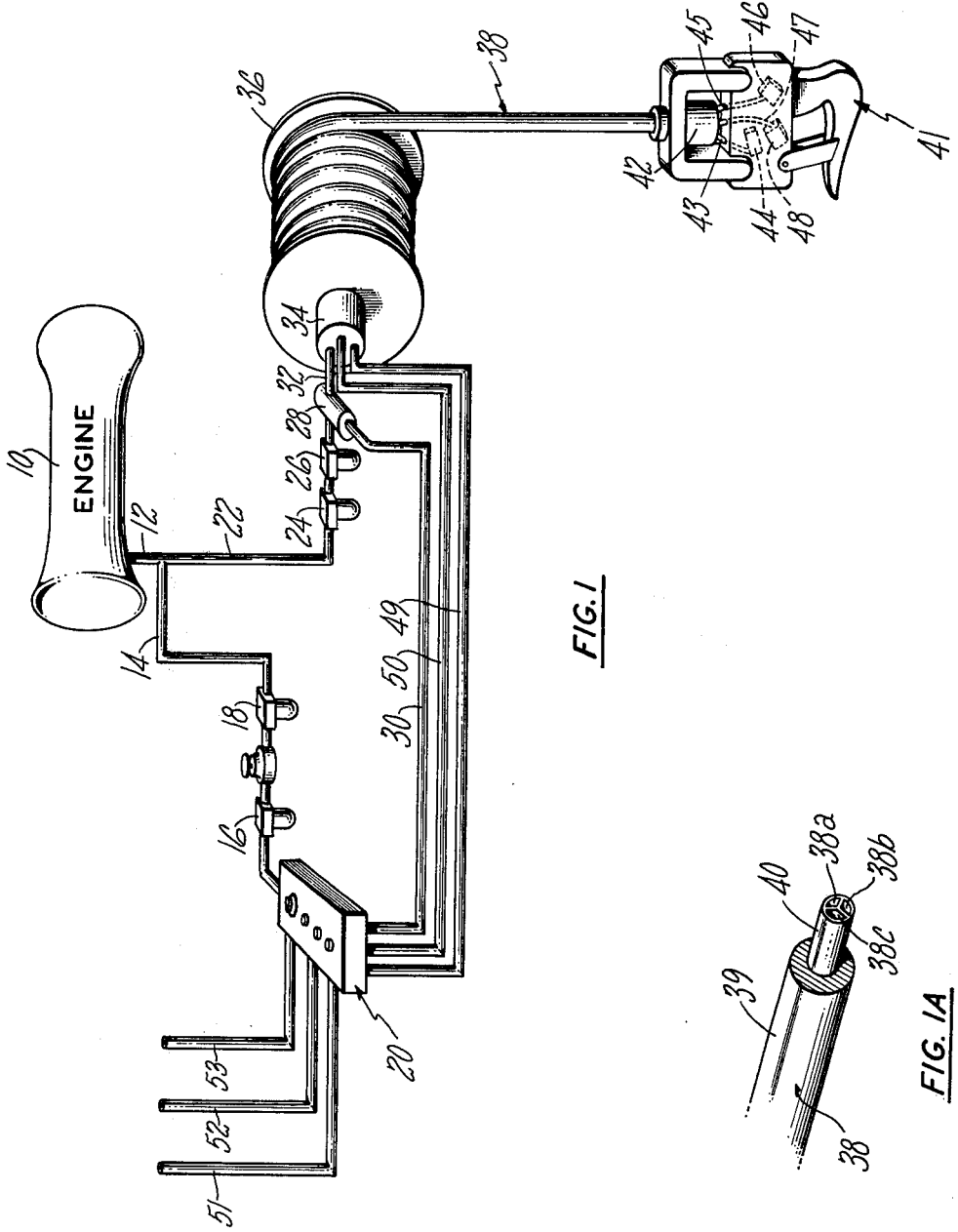
FIG. 1 is a schematic representation of the fluidically controlled cargo hook system showing the system in its aircraft environment and its relationship to the cargo hook.

Referring to FIG. 1 we see a showing of the cargo hook fluidic control system in its environment. The overall system includes engine 10, which is mounted aboard the aircraft, such as a helicopter of the type shown in U.S. Pat. No. D193,492, as either an auxiliary or the main powerplant and which is preferably a gas-turbine engine. Bleed air from engine 10 through line 12 and then either through line 14, where it passes through fluidic filters 16 and fluidic pressure regulators 18 before entering the integrated cargo hook fluidic control 20, or passes through line 22 and pneumatic filters 24 and 26 to interface valve 28. Interface valve 28 is of conventional design and serves to interface the fluidic control system with the pneumatic actuator system. The valve 28 is operated by fluidic control input thereto and serves to pass pneumatic supply through line 32 to fluidic stationary-to-rotary transfer mechanism 34 on cargo hook cable drum 36 and thence into one of the three fluid passages extending through cable 38 and more particularly through passage 38a as shown in FIG. 1a.

FIG. 1a shows that cable 38 has a protective sleeve 39 enveloping a three chambered plastic air tube 40, which is compartmented as shown to define chambers 38a, 38b and 38c extending therethrough. Cable 38 extends into hook stationary-to-rotary transfer unit 42 and therefrom through pneumatic tube 43 to hook actuator 44, and through tube 45 to hook loaded sensor 46, and through pneumatic tube 47 to hook closed sensor 48, which mechanism will be described in greater particularity hereinafter. Tube 45 and hook loaded sensor 46 are connected to cable passage 38c and pass a fluidic signal responsive to the hook loaded sensor 46 to the fluidic control box 20 through line 49. Tube 47 and hook closed sensor 48 are connected to cable 38b and provide a signal to the fluidic control box 20 responsive to the hook closed sensor 28 through conduit 50 in a fashion to be described in greater particularity hereinafter. The pilot, co-pilot and aft-pilot may each apply a fluidic signal to fluidic control box 20 through conduits 51, 52 and 53, respectively.

Figure 2:
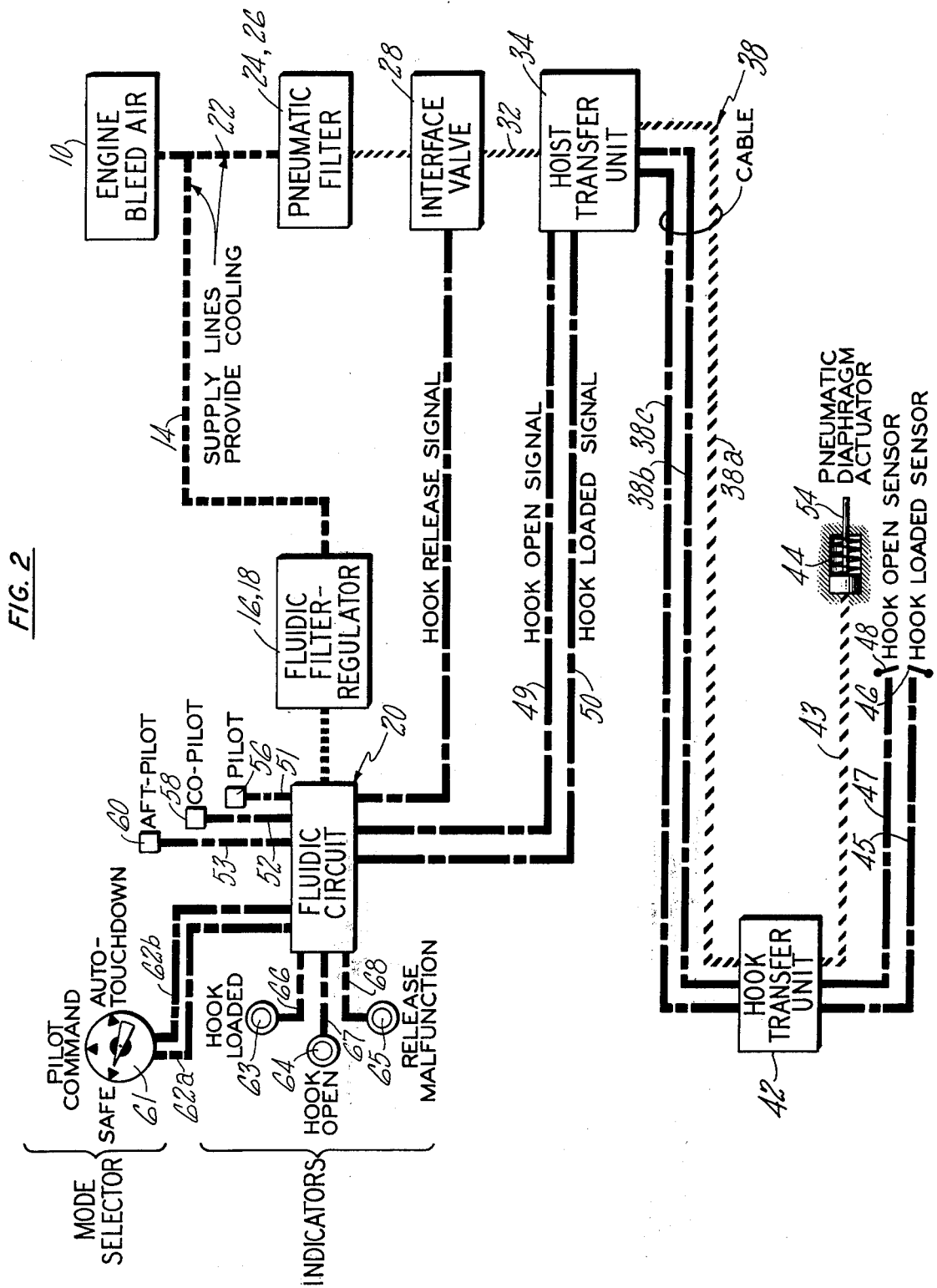
FIG. 2 is a basic circuit diagram of the fluidically controlled hook system.

Now referring to FIG. 2 we see a diagrammatic representation of the fluidically controlled cargo hook system and the same reference numerals used in FIGS. 1 and 1a are used to identify the corresponding parts in FIG. 2. In viewing FIG. 2 it should be noted that the bleed air supply from engine 10 is shown in heavy, regularly interrupted lines, the pneumatic control supply is shown in diagonal lines, the fluidic supply is shown with short heavy interrupted lines, and the fluidic output is shown in heavy, irregular by interrupted lines.

In viewing FIG. 2 it will be noted that as previously described in connection with FIG. 1, engine 10 supplies bleed air to fluidic circuit 20 and to interface valve 28. Interface valve 28 receives a hook release signal from the fluidic circuit 20 through conduit 30 and, in response thereto, conducts the filtered air from line 22 as pneumatic supply through cable conduit 38a and conduit 43 to pneumatic diaphragm actuator 44 so as to cause the piston therein to compress its biasing spring and act through output rod 54 to open the cargo hook 41 (see FIG. 1). FIG. 2 further shows that through pilot back pressure switch 56, co-pilot back pressure switch 58, and aft-pilot back pressure switch 60, fluidic signals can be imparted through conduits 51, 52 and 53, respectively, to the fluidic circuit 20. Mode selector 61 may be set as shown in FIG. 2 for either the safe mode of operation for pilot command or for automatic touchdown mode of operation so as to send fluidic signals to circuit 20 through conduits 62a or 62b. FIG. 2 further shows that hook loaded indicator 63, hook closed indicator 64 and hook release malfunction indicator 65 are fluidically connected by conduits 66, 67 and 68, respectively to the fluidic circuit 20.

In a manner to be described in greater particularity hereinafter in connection with FIG. 3 and the succeeding Figs., it will be seen that the fluidically controlled, pneumatically actuated cargo hook system shown in FIG. 2 is designed to accommodate three hook conditions; namely, an unloaded and open hook, an unloaded but closed hook, and a loaded and closed hook. The system shown herein is capable of preventing the opening of the cargo hook and hence the release of the cargo from the aircraft when the system is in the safe or inoperative mode of operation, despite any pilot command input or auto touch-down input to the system. It will further be shown that when the system is in the pilot command mode of operation, any of the pilot, co-pilot or aft-pilot can open the cargo hook and release the cargo. It will further be shown that in the auto touch-down mode of operation, the cargo hook will be automatically opened and hence the cargo released upon touch-down of the cargo, and that the pilot, co-pilot or aft-pilot may override the auto touch-down mode of operation upon their command. It will further be shown that hook loaded indicator 63, hook closed indicator 64 and hook release malfunction indicator 65 will be actuated from the fluidic circuit 20. It will further be shown that the hook closed member 48 and the hook loaded sensor 46 will impart hook condition signals therefrom back to the fluidic circuit 20 during operation of the system. Further, should the cargo hook fail to open during pilot command or automatic touch-down modes of operation, a release malfunction signal will be presented on the control panel. This release malfunction could be caused by, for example, mechanical binding of the hook causing the hook to open slowly or not at all, or a fluidic or pneumatic failure.

Figure 3:
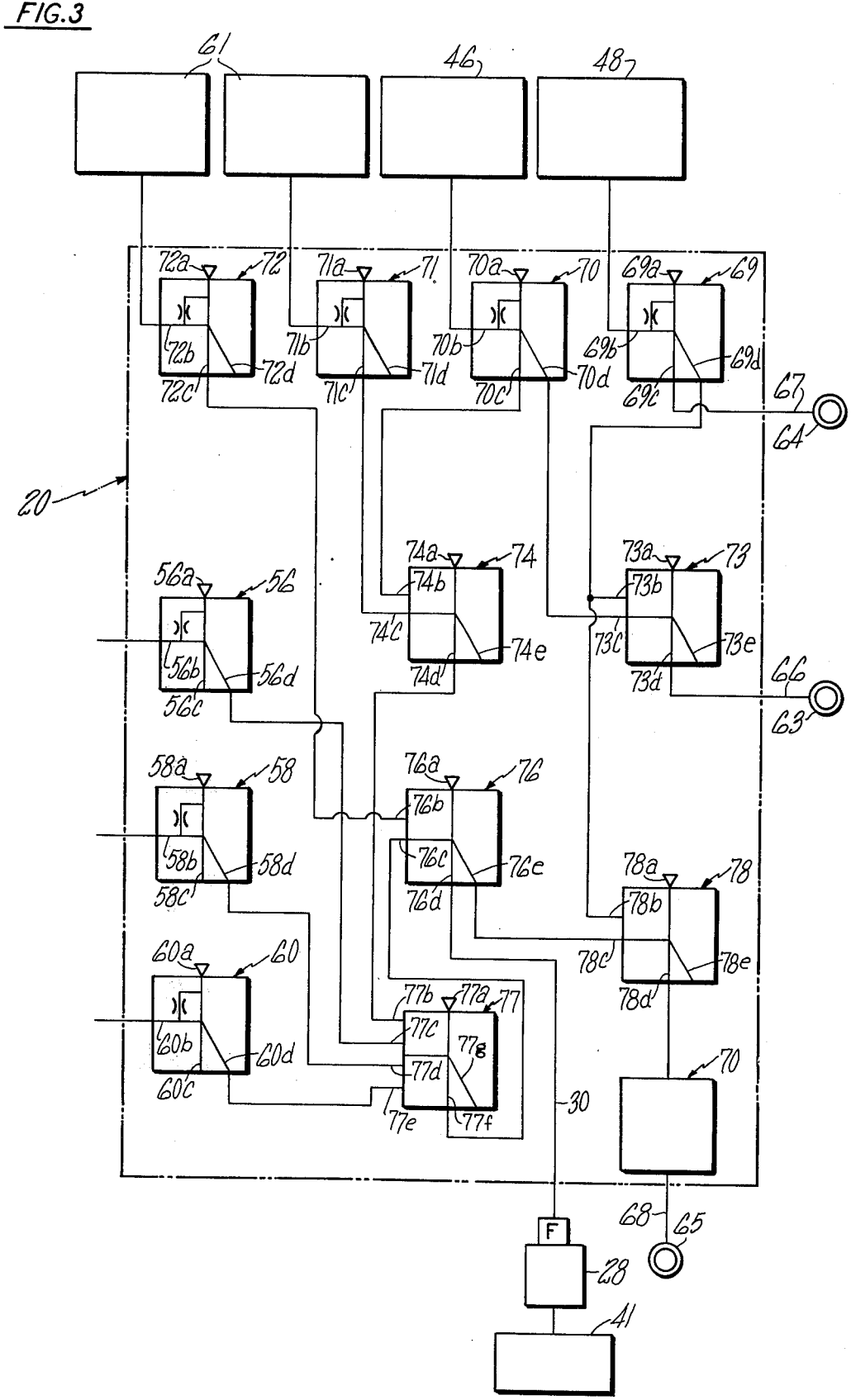
FIG. 3 is a showing of the complete fluidic circuit of the cargo hook control system illustrating the various signal indicators, condition sensors and mode selection switches used therewith.

For a detailed description of the operation of the fluidically controlled cargo hook system, reference will be made to FIG. 3 and the succeeding Figs. FIG. 3 shows that the fluidic circuit 20 is an integrated circuit including seven fluidic back pressure switches (henceforth called BPS) and five fluidic or/nor switches which are selectively connected and actuated to perform the functions of this system. The back pressure switches include hook open-closed condition BPS 69, hook loaded-unloaded condition BPS 70, auto touch-down on/off BPS 71, circuit on/off BPS 72, pilot BPS 56, co-pilot BPS 58, and aft-pilot BPS 60. Integrated circuit 20 also includes hook loaded signal actuating or/nor switch 73, hook loaded-unloaded condition BPS relay or/nor switch 74, cargo hook release or/nor switch 76, pilot BPS, auto touch-down BPS, and hook loaded-unleaded condition BPS relay or/nor switch 77, and release malfunction signal actuating or/nor switch 78. Mode selector 61, which is shown diagrammatically in FIG. 2 would control elements 71 and 72. Time delay relay 70 may be part of integrated circuit 20 or external thereof.

Still viewing FIG. 3, the various switches just identified will now be described to identify their relationship to the rest of the cargo hook control system. Each of the switches just described receives its fluidic supply from the bleed air of engine 10 through line 14 and filter-regulator 16–18. The fluidic input to each switch is through a common fluidic supply identified as 69a for hook open-close condition BPS 69. All the switches are the same in this regard. Referring to BPS 69 we see that that switch has input signal line or bleed 69b, which is controlled by the hook closed sensor 48 so as to be vented when the hook is closed and blocked when the hook is opened. When the hook 41 is closed, the fluidic supply from 69a passes through BPS 69 and out discharge conduit 69c to activate hook closed signal or indicator 64 to indicate that the hook is closed. When the hook is opened, sensor 48 blocks vent line 69b so that a back pressure builds up therein and causes the fluidic input from 69a to pass through fluidic output 69d and to input 73b of switch 73 and input 78b of switch 78.

Hook loaded-unloaded condition BPS 70 has its fluidic supply 70a and vent line 70b which is controlled by the hook loaded sensor 46 to be vented when the hook is either loaded or open so that the fluidic supply 70a flows through BPS 70 and through fluidic output conduit 70c to or/nor switch 74. When the hook is unloaded and closed, the hook loaded sensor 46 blocks vent line 70b so that the back pressure builds up therein and the fluidic supply from 70a is discharged through output conduit 70d to provide a second input signal to input 73c of or/nor switch 73.

Auto touch-down on/off back pressure switch 71 includes fluidic supply 71a, bleed line 71b which is controlled by the mode selector 61 so as to be vented when the system is not in the auto touch-down mode of operation, thereby causing the fluidic supply from 71a to flow through output 71c to become an input signal 74b to or/nor switch 74, and to be blocked when in the auto touch-down mode of operation so as to cause the fluidic output of switch 71 to vent through output 71d. Circuit operative-inoperative or on/off or on/safe BPS 72 includes fluidic input 72a and bleed line 72b which is controlled by the mode selector 61 so as to be vented when the system is not operating in the safe or inoperative mode, thereby causing the fluidic output to be through fluidic discharge conduit 72c to become input 76b to or/nor switch 76. When the mode selector is in the system on or operative mode of operation, lead line 72b is blocked thereby venting the fluidic output of switch 72 through output conduit 72d.

Pilot BPS 56 includes fluidic supply 56a and bleed line 56b which normally vents and thereby permits the fluid from fluidic inputs 56a to be vented through discharge conduit 56c. When the pilot blocks off vent 56b, a back pressure is built up therein to cause the fluidic output to be through conduit 56d and hence become input signal 77c to switch 77. Co-pilot BPS 58 and aft-pilot BPS 60 operate in the same fashion so that the fluidic supplies 58a and 60a are normally vented through discharge conduit 58c and 60c but are caused to discharge through conduits 58d and 60d when the co-pilot and aft-pilot, respectively, block off bleed lines 58b and 60b, so as to provide an input signal to 77d and 77e of or/nor switch 77.

Hook loaded signal actuating or/nor switch 73 includes fluidic supply 73a, fluidic input line 73b connected to receive an input signal from switch 69, fluidic input 73c connected to receive an input signal from switch 70, fluid discharge line 73d connected through line 66 to actuate hook loaded indicator 63, and outlet 73e which is vented. Since the system is designed such that the hook cannot be open and loaded at the same time, the indicators 63 and 64 must be properly controlled so as not to provide a false indication. This is accomplished as follows: Switch 73 operates so that when it is not receiving a signal from either switch 69 or 70 through inlets 73b or 73c, the fluid passes from supply 73a through discharge conduit 73d to actuate hook loaded indicator 63. When switch 73 is receiving a signal from either switch 69 or 70 through either inlet 73b or 73c, the fluidic discharge from switch 73 is vented through discharge conduit 73e, so that a fluidic input signal from either switch 69 or 70 disarms switch 73, therefore no hook loaded indication. It should be noted that indicators 63, 64 and 65 may be of any conventional type, such as an electric light, an audible signal, or a reciprocating plunger.

Auto touch-down BPS and hook loaded-unloaded condition BPS relay or/nor switch 74 includes fluidic supply 74a, fluidic input signal line 74b connected to receive a signal from output 70c of switch 70, fluidic input line 74c connected to receive a fluidic input signal from output 71c of switch 71, fluid discharge conduit 74d connected to provide an input signal to 77b of switch 77, and fluid discharge conduit 74e connected to vent. In operation, when switch 74 is receiving a fluidic input signal from either switch 70 or 71 through input conduit 74b or 74c, the switch is disarmed. When switch 74 is receiving a signal from neither switch 70 nor 71, switch 74 provides an input signal to 77b of switch 77.

Cargo hook release or/nor switch 76 includes fluidic supply port 76a, fluidic input line 76b connected to receive a fluidic input from 72c of switch 72, fluidic input line 76c connected to receive a fluidic input from 77f of switch 77, fluidic discharge line 76d connected to provide a fluidic signal through line 30 to interface valve 28 and thereby release pneumatic supply to actuate the cargo hook, and fluid discharge conduit 76e connected to provide an input signal to 78c of switch 78. In operation, when switch 76 is not receiving a signal from either switch 72 or 77, the fluid discharge is through conduit 76d to open the interface valve and release the cargo. When a fluid input is being received at switch 76 from either switch 72 or 77, the fluid discharge is through conduit 76e to switch 78 to disarm switch 78 as described hereafter.

Pilot BPS, auto touch-down BPS and hook load condition BPS relay or/nor switch 77 includes fluidic supply 77a, a fluidic input signal port 77b connected to 74d of switch 74, a fluidic input port 77c connected to 56d of switch 56, a fluidic input port 77d connected to 58d of switch 58, and a fluidic input port 77e connected to 60d of switch 60, fluid output conduit 77f connected to provide a fluid input signal to 76c of switch 76 and fluid output conduit 77g to vent. Switch 77 operates so that when not receiving an input signal from any one of switches 74, 56, 58 or 60, switch 77 provides an input signal to switch 76. When receiving an input signal from any of switches 74, 56, 58 and 60, switch 77 is disarmed and its fluidic input to switch 76 is terminated.

Release malfunction signal actuating or/nor switch 78 includes fluid supply port 78a, a fluid input signal conduit 78b connected to receive a signal from 69d of switch 69, a fluid input signal conduit 78c connected to receive a fluid input signal from 76e of switch 76, fluid conduit discharge 78d connected to line 68 to actuate release malfunction indicator 65, and fluid discharge conduit 78e to vent. In operation, switch 78 is disarmed when it receives a signal from either switch 69 or 76 and switch 78 provides a signal to actuate release malfunction indicator 65 when receiving an input signal from neither switch 69 nor 76.

Time delay relay 70 is placed between switch 78 and indicator 65 to prevent switch 78 from actuating indicator 65 for a selected period of time, possibly two or three seconds, for reasons to be described in greater particularity hereinafter.

This description of the fluidic control system illustrated in FIG. 3 will give sufficient background for an understanding of the operation of the system now to be undertaken.

Figure 4:
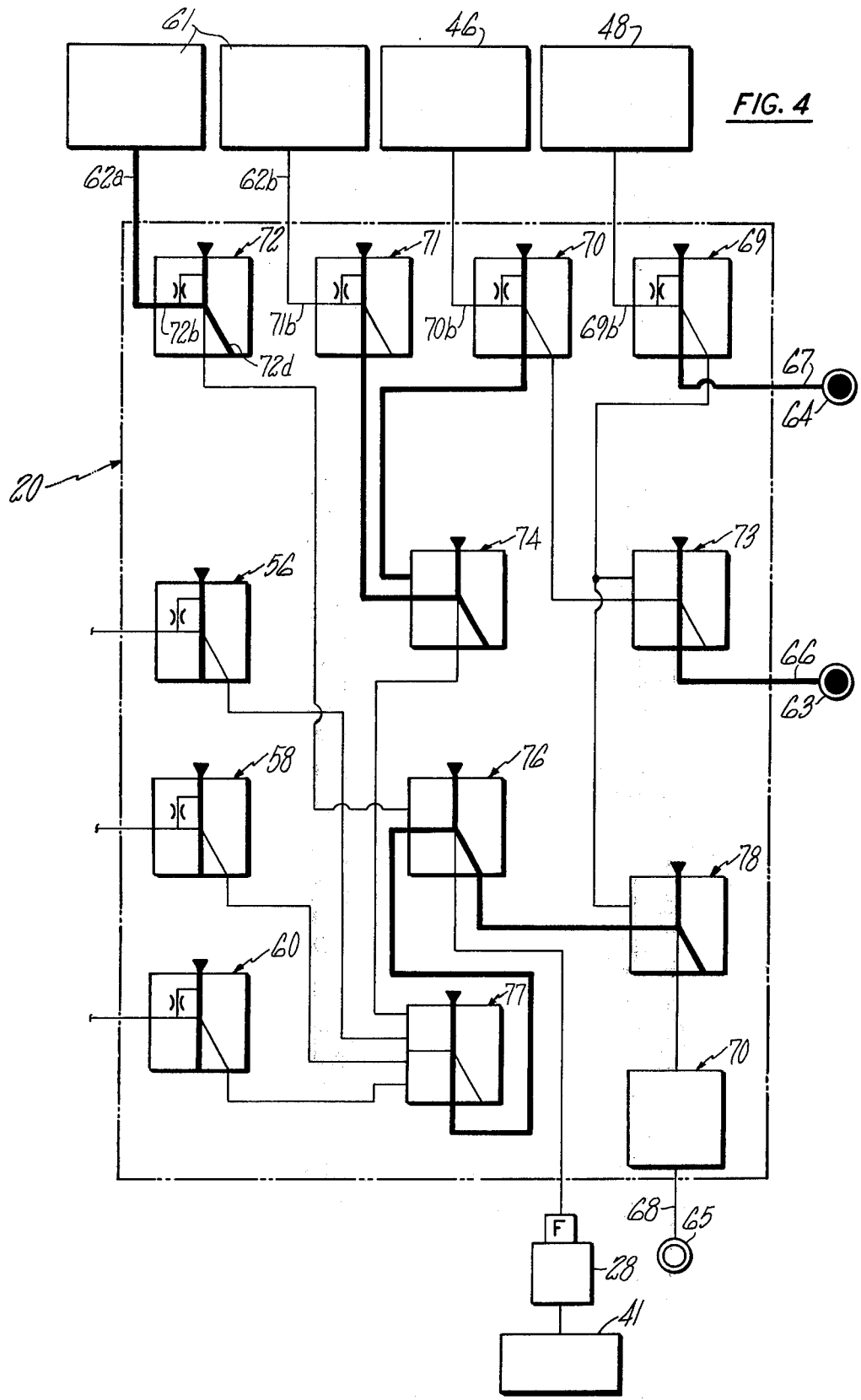
FIG. 4 is a showing of the fluidic circuit in the pilot command mode of operation and with the cargo hook closed and loaded.

Let us first consider the pilot command mode of operation wherein the cargo is loaded onto a closed cargo hook and the load is so suspended beneath the aircraft. This could be the condition which the pilot might select at takeoff so that he has the option of quickly releasing the cargo if it presents problems during the takeoff procedure. The pilot might also select pilot command mode of operation during flight to give him the option of jettisoning the load if desired. Fluidic circuit 20 is shown in the pilot command mode of operation in FIG. 4 to which reference will now be made. With the selector 61 placed in the "on" position, it will block the bleed line 72*b* of circuit operative-inoperative BPS 72 so as to disarm that switch by causing the fluid discharge therefrom to be vented through discharge conduit 72*d*. In this position, mode selector 61 also vents conduit 71*b* of auto touch-down on/off back pressure switch 71 to provide a continuous, diasarming input signal to switch 74. Since hook loaded sensor 46 indicates a loaded hook, vent line 70*b* of hook loaded-unloaded condition BPS 70 is open so that switch 70 also provides a continuous, disarming input signal to relay switch 74. Hook closed sensor 48 causes vent line 69*b* of hook open-close condition BPS to be open, thereby causing switch 69 to actuate hook closed indicator 64. Since hook loaded signal actuating or/nor switch 73 is not receiving a signal from either switch 69 or 70, it serves to actuate hook loaded indicator 63. Since pilot, co-pilot and aft-pilot BPS 56, 58 and 60 have their vents open, they are disarmed. Since relay switch 77 is not receiving a signal from switches 74, 56, 58 or 60, it is providing an input signal to switch 76 to cause its discharge to be through conduit 76*e* to disarm switch 78. Accordingly, with switches 76 and 78 disarmed, the cargo is being carried by the cargo hook from the aircraft and the release malfunction indicator 65 is inoperative. It will therefore be seen that with the control system in the pilot command mode of operation and when the aircraft is carrying the cargo from the cargo hook, our fluidic control system is as shown in FIG. 4. The pilot, co-pilot and aft-pilot each have the option at their command of releasing the cargo hook and therefore the load.

Figure 4A:
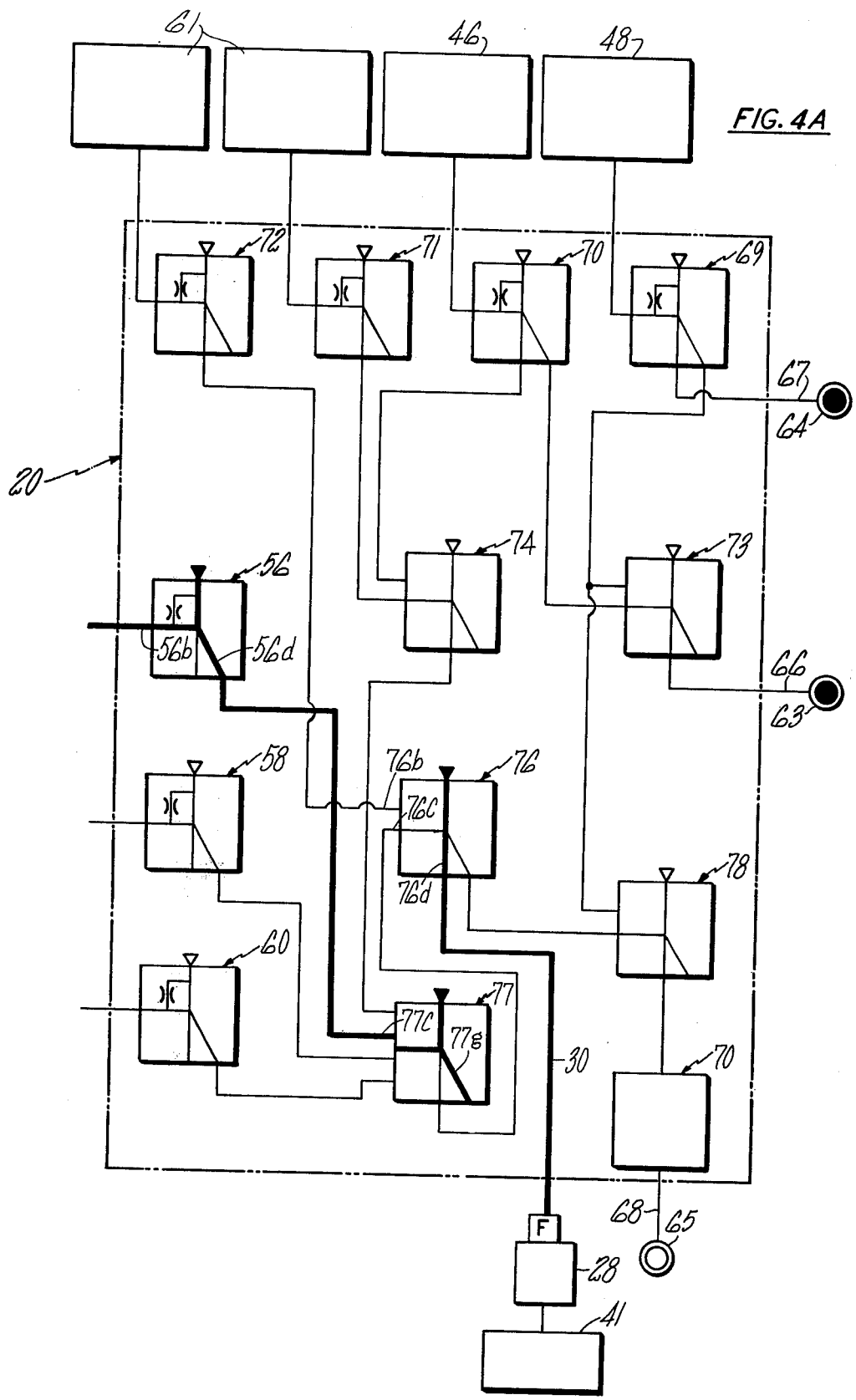
FIG. 4a corresponds to FIG. 4 and illustrates operation of the fluidic circuit when the pilot exercises his option of releasing the load.

When the pilot, for example, exercises his option of jettisoning the cargo by opening the cargo hook, the condition shown in FIG. 4*a* applies wherein the pilot has blocked off the bleed 56*b* of switch 56, discharge therefrom is through 56*d* to thereby deactivate switch 77 by causing its fluid discharge to vent through discharge passage 77*g*. Accordingly, switch 76 no longer receives an input signal from switch 77, and since it is also not receiving an input signal from switch 72 through inlet conduit 76*b*, the fluidic discharge from switch 76 is through fluidic discharge conduit 76*d* and line 30 to interface valve 28 to open the cargo hook and release the cargo. As shown in FIG. 4*a*, the signal 76*e* from switch 76 which formerly deactivated switch 78 no longer passes thereto so that switch 78 would be expected to actuate release malfunction indicator 65, but this will not occur due to the presence of time delay relay 70 therebetween for reasons explained in connection with the description of FIG. 4*b* now to be undertaken. If the cargo hook 28 had not released upon pilot command, switch 78 would be receiving fluidic input from neither switch 76 nor switch 69 so that, when the time delay of 70 elapses, switch 78 will energize release malfunction signal 65 to so warn the pilot.

Figure 4B:
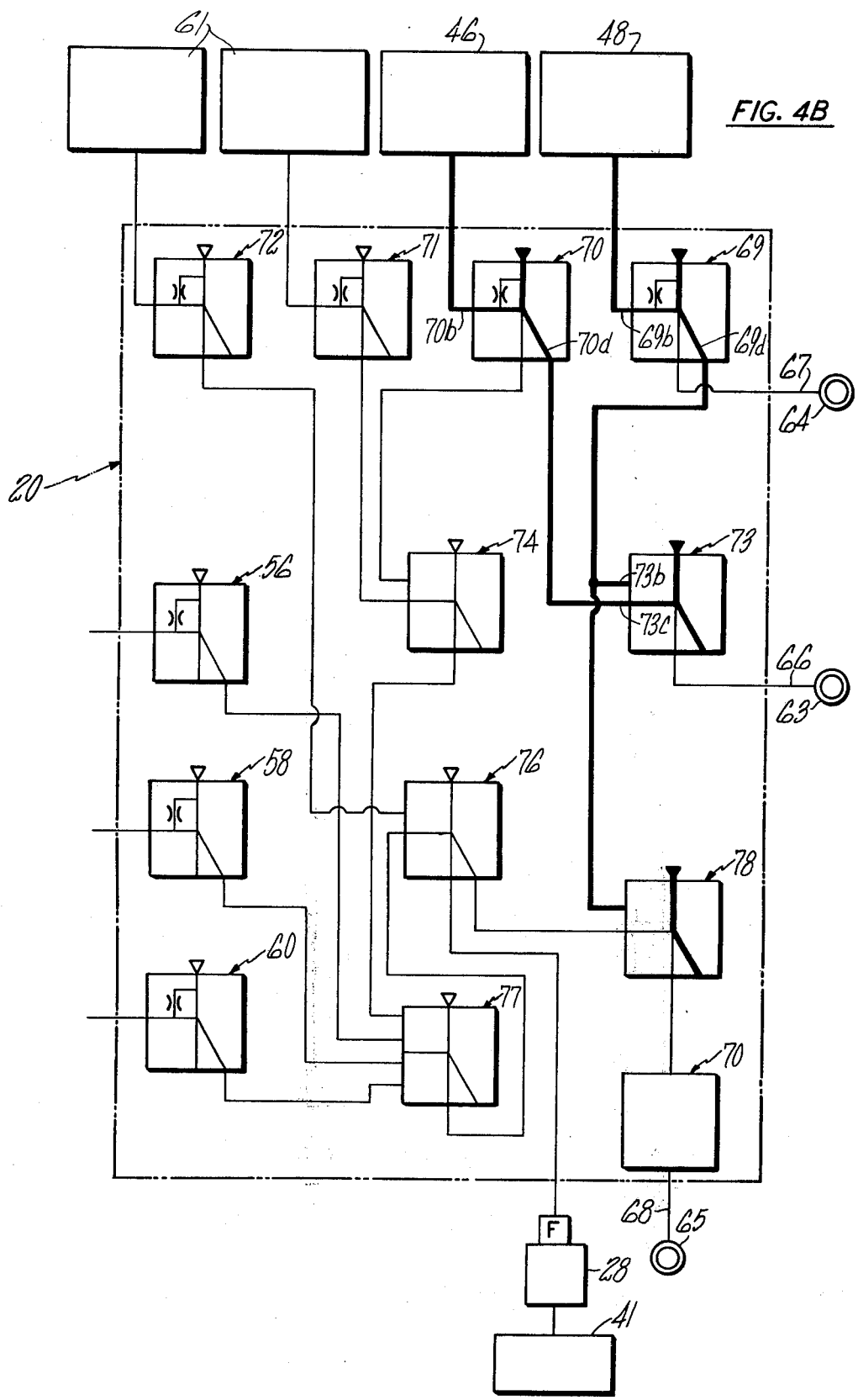
FIG. 4b corresponds to FIG. 4 and illustrates sensor reactions to the pilot release of the load.

Referring to FIG. 4*b* we see the portion of fluidic circuit 20 which is actuated by the release of the cargo during the pilot mode of operation as described in connection with 4*a*. With the cargo released the hook is now open so the hook closed sensor 48 blocks vent line 69*b* of switch 69 so as to deactivate hook closed indicator 64 and cause the fluidic discharge from switch 69 to flow through discharge passage 69*d* to provide an input signal to switch 73 through input signal conduit 73*b*, thereby to deactivate hook loaded indicator 63. With the cargo released, the hook is also unloaded so that hook loaded sensor 46 is actuated to block vent line 70*b* of switch 70, to cause the discharge therefrom to be through discharge conduit 70*d* and hence provide a fluidic input signal to switch 73 through input conduit 73*c* to thereby disarm switch 73 and deactivate hook loaded indicator 63. Switch 69 also provides an input signal to switch 78 to deactivate switch 78 and hence prevent the actuation of hook release malfunction indicator 65. Time delay relay 70 is positioned between switch 78 and hook release malfunction indicator 65 to permit circuit 20 a given period of time, tuned to the normal time interval that a hook open signal would reach switch 78 and a release was initiated, to deactivate switch 78 due to the action of switch 69 after the signal to switch 78 from switch 76 has been removed therefrom, thereby removing its deactivating effect on switch 78. Had the system malfunctioned so that the hook actually remained closed, despite the pilot command, the hook closed sensor 48 would cause switch 69 to pass its fluid discharge signal to indicator 64 rather than to switch 78 so that switch 78 would be receiving no fluidic input signal and would therefore discharge through TDR70 and line 68 to actuate hook release malfunction indicator 65.

Figure 5:
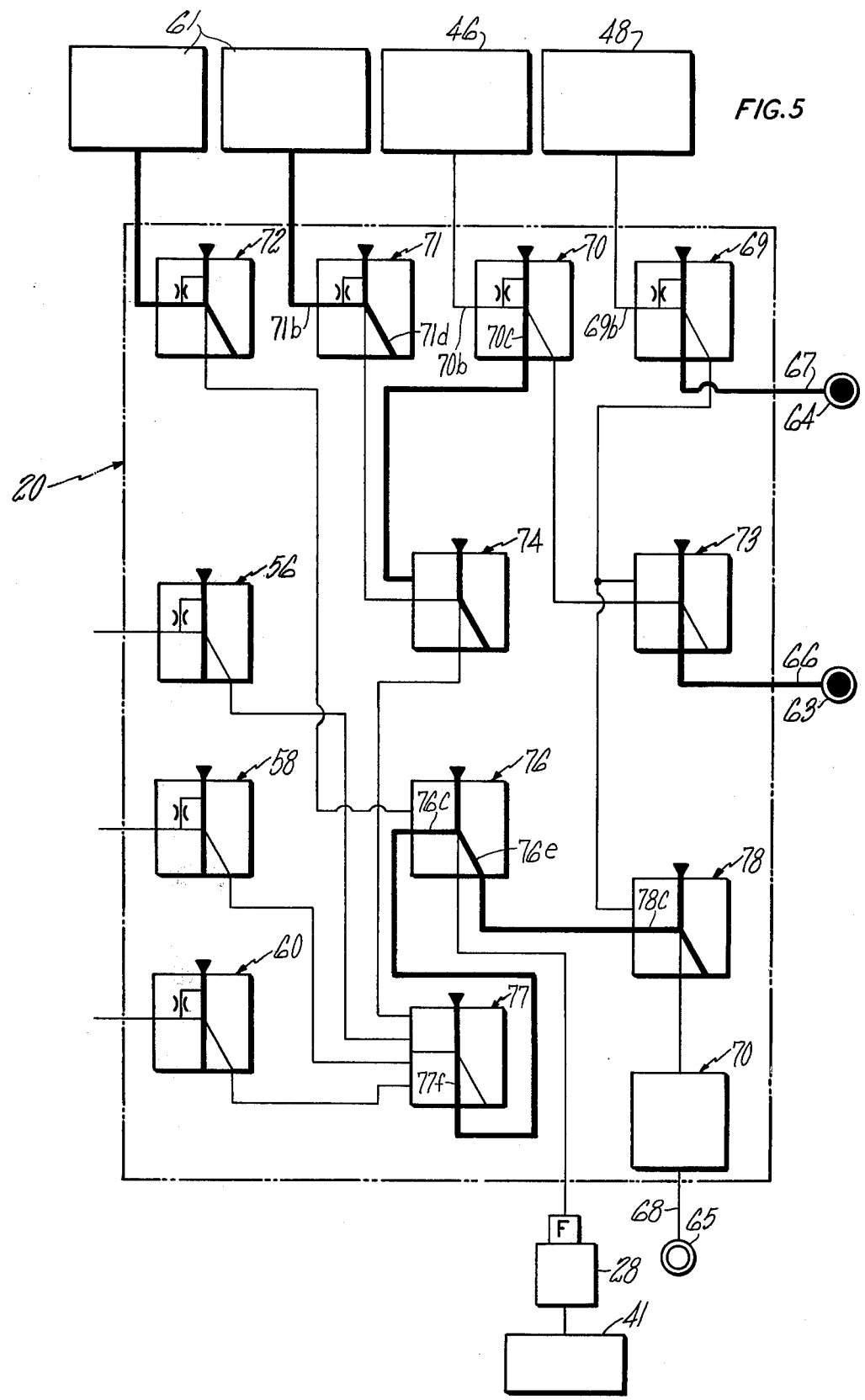
FIG. 5 is a showing of the fluidic circuit in the auto touch-down mode of operation with the cargo hook closed and loaded.

The auto touch-down mode of operation will next be explained by considering FIGS. 5, 5*a* and 5*b*. In the auto touch-down mode of operation, the pilot wishes to have the hook opened and the cargo or load automatically released upon touch-down of the load to the ground, without the need for a ground crew. For example, a pilot might decide to place control 20 in the automatic touch-down mode when he is coming in to deposit the first load and when, without landing, he wished to release the first load once it touched the ground so as to free the aircraft to proceed immediately to get the next load without the need for landing and without the assistance of a ground crew for releasing the cargo.

Viewing FIG. 5 we see fluidic control 20 in the auto touch-down mode of operation wherein mode selector 61 serves to disarm switch 72 as described in connection with FIG. 4. Mode selector 61 also serves to disarm switch 71 by blocking vent 71*b* and causing the fluid discharge to be through discharge conduit 71*d*. With the hook loaded, the hook loaded sensor 46 will cause switch 70 to vent through vent line 70*b* so that the fluidic discharge from switch 70 is through discharge conduit 70*c* so as to provide an input signal to thereby disarm switch 74. Since the hook is closed, hook closed sensor 48 will vent switch 69 through vent line 69*b* to thereby cause switch 69 to activate hook closed indicator 64. Since neither switch 69 nor 70 is providing a signal to switch 73 in this mode, switch 73 activates hook loaded indicator 63. Switches 56, 58 and 60 are all being vented and hence inactivated so that none passes a fluidic input signal to switch 77. Since switch 77 is receiving no input signal, it discharges through conduit 77*f* to provide a fluidic input to conduit 76*c* of switch 76 so as to cause fluidic discharge therefrom through conduit 76*e* and thereby provide an input signal to switch 78 at input signal conduit 78*c* to disarm switch 78. Accordingly, when when the pilot is flying with the cargo hook closed and loaded in the auto touch-down mode of operation, the fluidic circuit 20 is as shown in FIG. 5 with the hook closed indicator and hook loaded indicator actuated and the hook release malfunction indicator not actuated.

Figure 5A:
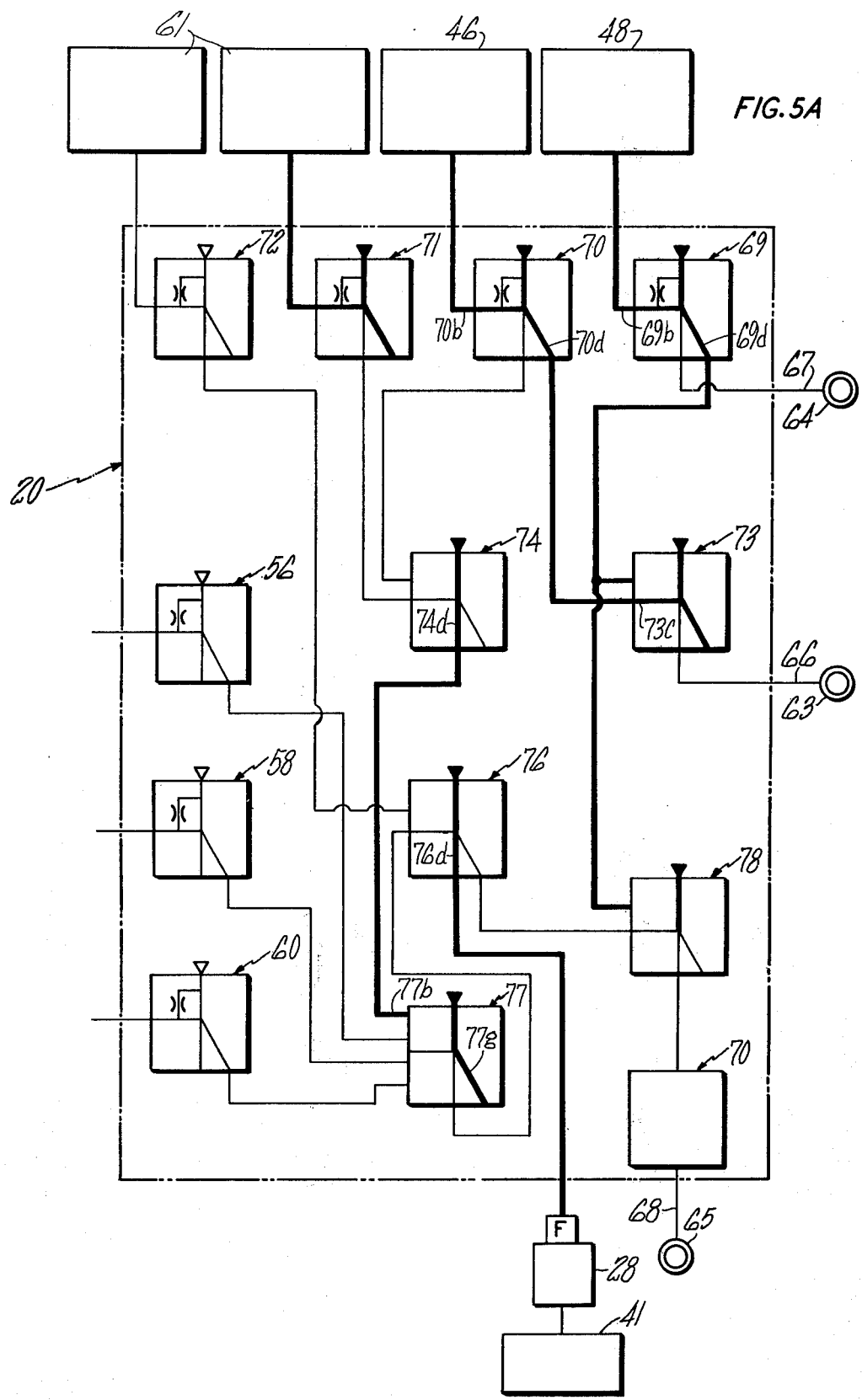
FIG. 5a corresponds to FIG. 5 and shows the operation of the fluidic circuit at cargo touch-down, illustrating sensor reactions.
Figure 5B:
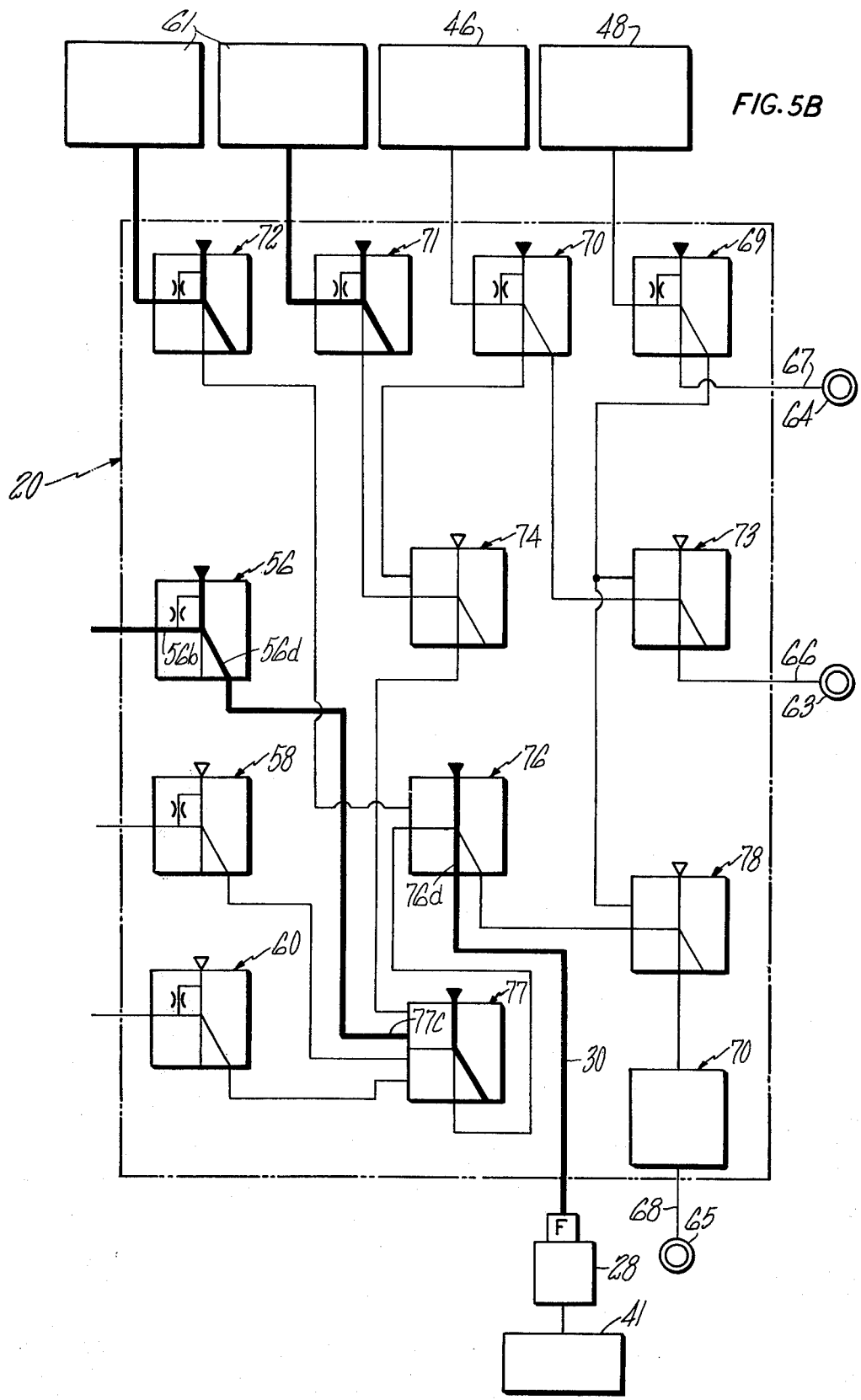
FIG. 5b corresponds to FIG. 5 and illustrates the pilot override capability of the circuit during the automatic touch-down mode of operation.

At the point of cargo touch-down when in the auto touch-down mode of operation, fluidic circuit 20 is as shown in FIG. 5a. When the hook becomes unloaded and sensor 46 blocks vent line 70b of switch 70, it causes the fluidic discharge therefrom to be through conduit 70d and thereby provide an input signal to input signal conduit 73c of switch 73 to deactivate that switch and inactivate the hook loaded indicator 63. At the same time, the fluidic input signal which had previously been received by switch 74 from switch 70 in the FIG. 5 condition is discontinued so that switch 74 is receiving no fluid input signals, thereby causing fluid discharge therefrom through conduit 74d so as to provide an input signal to input conduit 77b of switch 77 to thereby cause fluid discharge therefrom through conduit 77g to thereby discontinue fluid discharge therefrom from switch 77 to switch 76, thereby causing switch 76 to discharge through outlet 76d to interface valve 28 to open the cargo hook and release the cargo automatically. The input signal which had previously been received by switch 78 from switch 76 is discontinued at the same time. When the cargo hook opens, sensor 48 blocks vent 69b of switch 69 to deactivate hook closed indicator 64 and cause the fluid discharge from 69 to be through conduit 69d to thereby provide a signal to both switches 73 and 78. Time delay relay 70 serves as previously described to prevent switch 78 from actuating hook release malfunction indicator 65 if the signal to switch 78 from switch 69 is delayed less than a selected number of seconds from the time that the signal from switch 76 is withdrawn from switch 78.

Had the hook failed to open in the automatic touch-down mode of operation, neither switch 76 nor switch 69 would supply a fluidic signal to switch 78, so that, after the time delay of 70 elapses, switch 78 is energize release malfunction signal 65 to so warn the pilot.

One of the important features of the fluidic control is that when in the automatic touch-down mode of operation, the pilot, co-pilot or aft-pilot is capable of overriding the automatic touch-down mode fluidic signals or controls and to cause the cargo to be released or jettisoned at pilot command in the event of an emergency. This capability is best understood by viewing FIG. 5b which shows the functioning of circuit 20 when the pilot supplies the command to jettison the cargo while the system is in the auto touch-down mode of operation. It should be borne in mind that the co-pilot or aft-pilot could have supplied a similar command. The pilot may elect to block vent line 56b of switch 56 so as to cause the fluidic output thereof to be through conduit 56d to provide an input signal to input conduit 77c of switch 77 to thereby deactivate switch 77 and discontinue the output signal therefrom to switch 76, thereby causing switch 76 to discharge through conduit 76d and line 30 to open the cargo hook so as to release or jettison the cargo. No auto touch-down mode function can interfere with this pilot command jettisoning.

Figure 6:
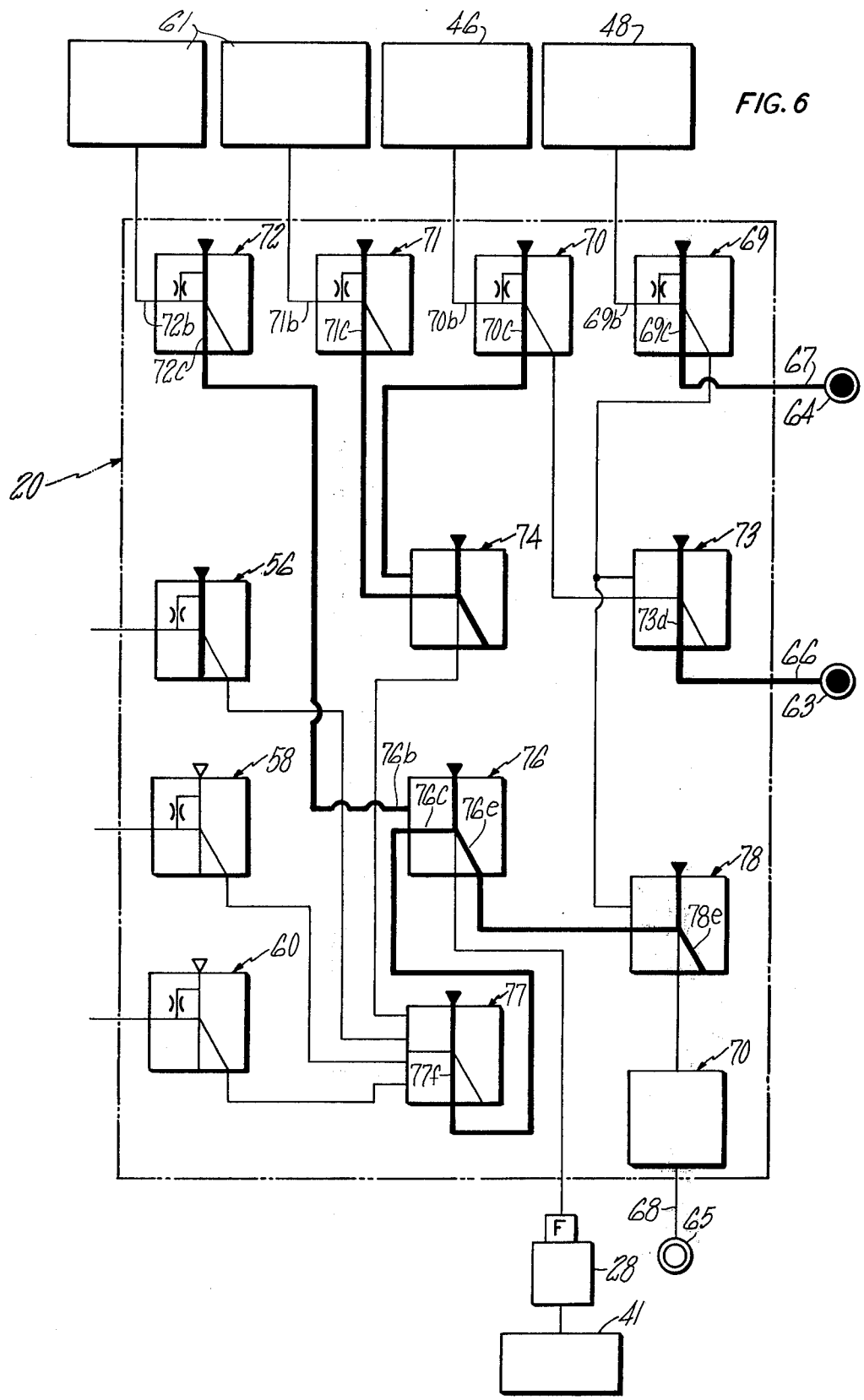
FIG. 6 is a showing of the fluidic circuit in the circuit-safe or inoperative mode of operation.

Another feature of the fluidic control is that when the mode selector is in the circuit safe or inoperative position shown in FIG. 2, neither pilot fluidic signal input, nor automatic touch-down fluidic signal input can cause the cargo to be released. The operation of circuit 20 when in the circuit off, safe or inoperative mode of operation is shown in FIG. 6 wherein mode selector 61 vents line 72b of switch 72 so as to cause the fluidic discharge therefrom to be through discharge conduit 72c and hence to provide a continuous fluidic input signal to input conduit 76b of switch 76 thereby disarming switch 76, and causing the fluidic discharge flow therefrom to be through conduit 76e to switch 78 to thereby cause the fluid discharge therefrom to be through conduit 78e to also disarm switch 78. At the same time the vents for pilot switches 56, 58 and 60 are vented so that these switches are disarmed. Further mode selector 61 vents lines 71b of auto touch-down switch 71 so that the fluidic discharge therefrom is through conduit 71c so as to supply a fluidic input signal to switch 74 to disarm that switch. It will be noted that because switches 56, 58, 60 and 74 are disarmed, there are no fluidic inputs to switch 77 and hence switch 77 provides fluid discharge to conduit 77f to provide a second input signal to switch 76 through input conduit 76c. The hook loaded sensor 46 vents line 70b of switch 70 so as to cause discharge fluid therefrom through conduit 70c to provide a second input signal to switch 74 as in the pilot command mode. Hook closed sensor 48 vents line 69b so as to cause switch 69 to discharge through conduit 69c and actuate hook closed indicator 64. Sensor switch 73 is not receiving input signals and therefore discharges through conduit 73d to actuate hook loaded indicator 63. It will, therefore, be seen that with circuit 20 in the circuit safe mode of operation and with the aircraft cargo hook closed and carrying the cargo, circuit 20 is operating as shown in FIG. 6. It will also therefore be seen that in the circuit inoperative or safe mode of operation, we have a disarm system to switch 76 and this provides the advantage that neither an inadvertant actuation of any of switches 56, 58 or 60 nor a touchdown of the cargo and its attendant unloading of the hook will result in opening of the hook. The circuit "safe" position of selector 61 thus is a lock to the system and prevents hook opening regardless of any other signal while maintaining the readiness of the circuit; that is no start up lag time, for quick operation if "on" mode or "auto touch-down" mode is selected.

Figure 6A:
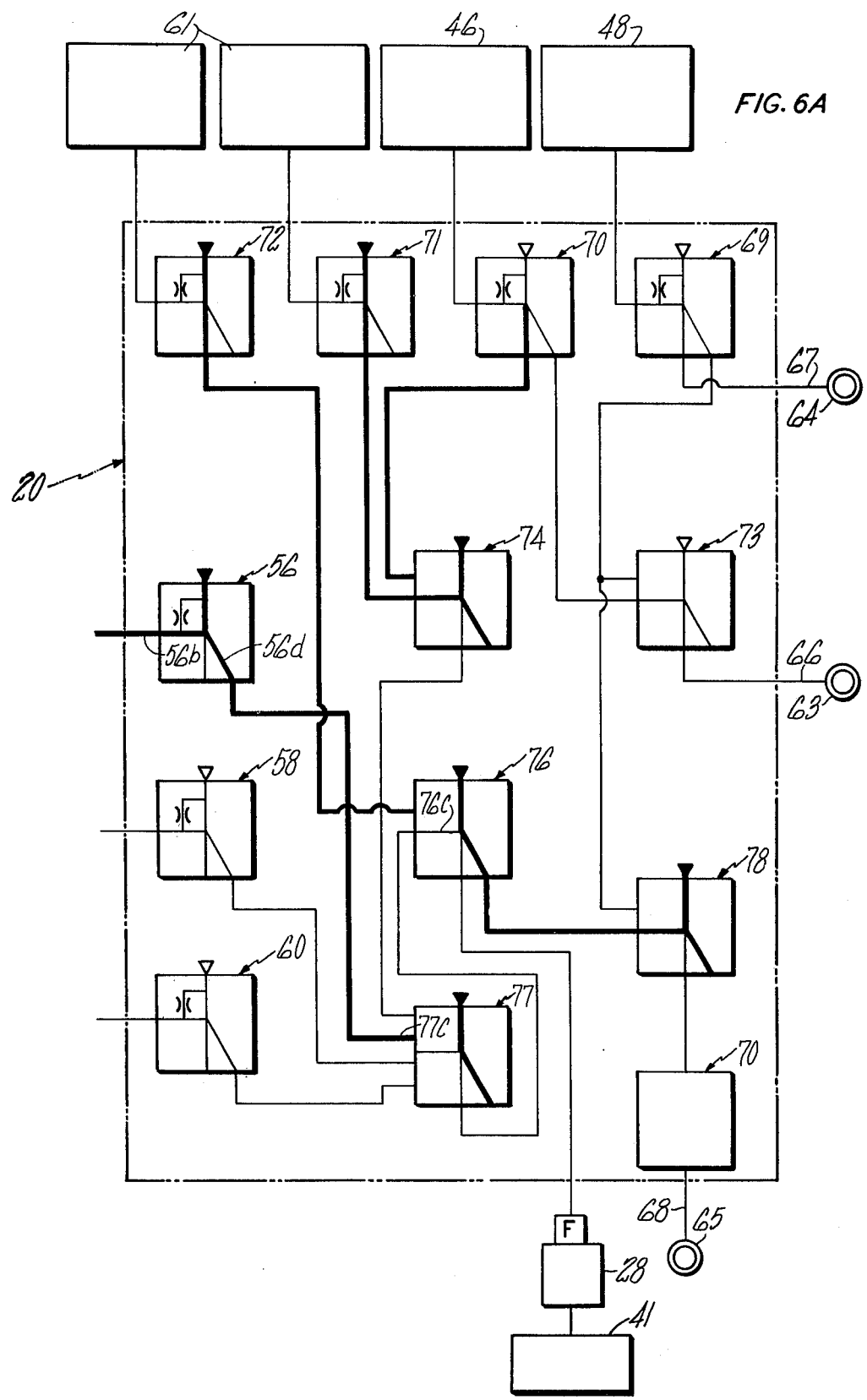
FIG. 6a corresponds to FIG. 6 and illustrates the ineffectiveness of the pilot attempt to override during the circuit safe mode operation.

To demonstrate the ineffectiveness of attempting to release the cargo by a pilot, co-pilot or aft-pilot input to switches 56, 58 or 60 when circuit 20 is in the circuit safe or inoperative mode of operation, reference will be made to FIG. 6a which shows circuit 20 identical in operation to the FIG. 6 circuit but wherein the pilot has blocked vent line 56b of switch 56 to cause fluidic discharge flow therefrom through conduit 56d and thereby impart a fluidic signal to input conduit 77c of switch 77 so as to deactivate switch 77 and discontinue the input signals therefrom to input conduit 76c of switch 76. This action, it will be noted, is ineffective to release the cargo because switch 76, which is of the or/nor type, is continuously receiving an input signal from switch 72 so that switch 76 continues to deactivate switch 78 rather than to provide a fluidic output signal to release the cargo. It will, therefore, be seen that pilot, co-pilot and aft-pilot input cannot be used to override the circuit safe or inoperative mode of operation. It will be understood that the action of the co-pilot and aft-pilot will be comparable to the action of the pilot described in connection with FIG. 6a.

Figure 6B:
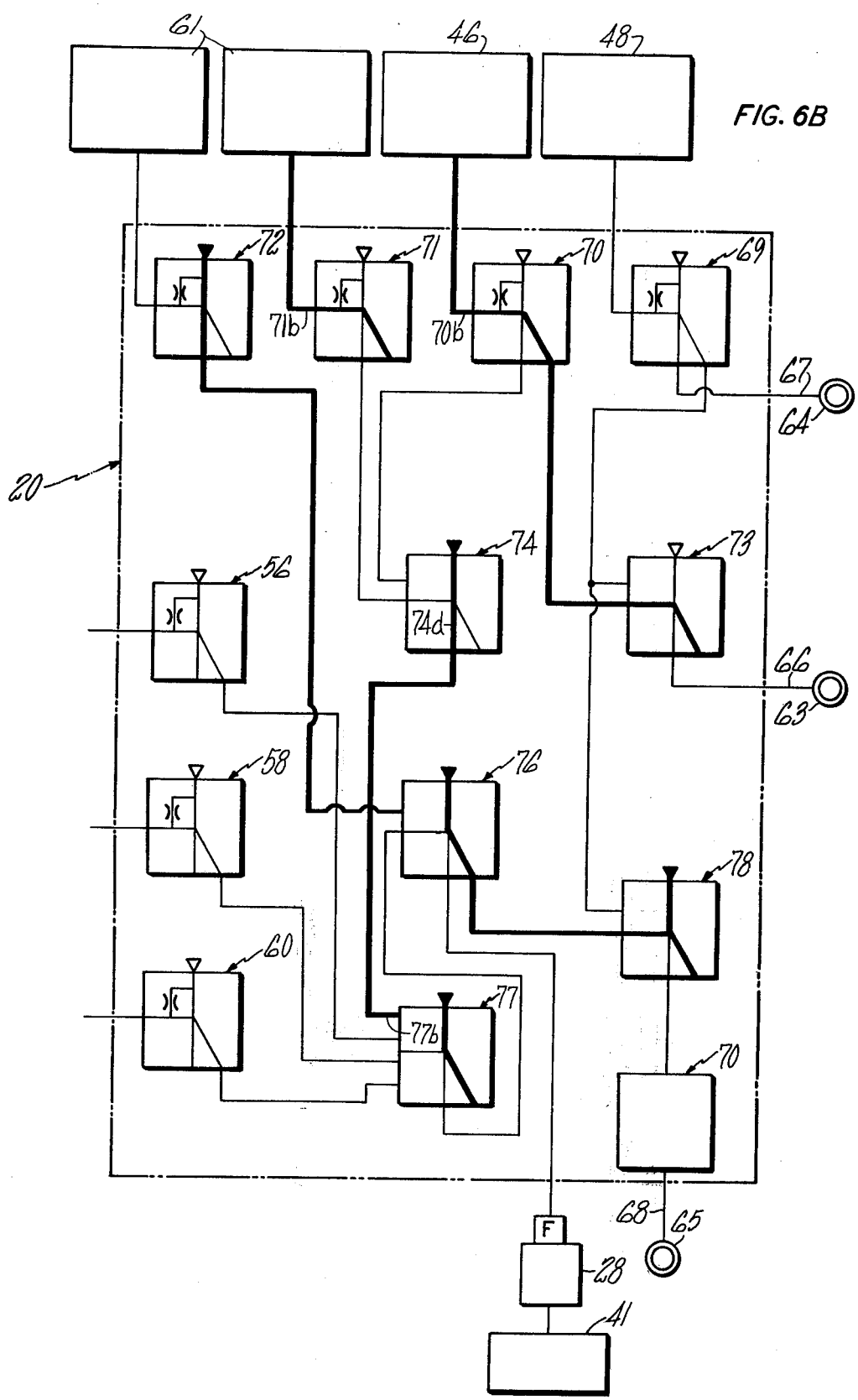
FIG. 6b corresponds to FIG. 6 and illustrates the ineffectiveness of the auto touch-down mode signals to override during the circuit safe mode of operation.

An important consideration in the pilot's decision to operate in the circuit safe or inoperative mode of operation rather than auto touch-down is that with the circuit in the automatic touch-down mode of operation in flight, a gust of wind or aircraft maneuver may unload the helicopter cargo hook so that the hook will be opened and the cargo would be automatically released having sensed an apparent cargo touch-down. With system 20 in the circuit safe or inoperative mode of operation, hook unloading for any reason cannot jettison the cargo. The condition which would be created by such a circumstance is best shown in FIG. 6*b* wherein the auto touch-down "on" signal blocks vent 71*b* of switch 71 so that the signal is no longer sent therefrom to switch 74, however, since the hook is loaded, switch 70 continues to disarm switch 74. When the hook experiences an apparent load touch-down due to wind gust or the like, switch 70 discharges to disarm switch 73 and turn off the hook loaded indicator 64, and switch 74, now not receiving any input signal as shown in FIG. 6*b*, discharges through fluidic outlet 74*d* to provide an input signal to fluidic input 77*b* of switch 77, thereby disarming switch 77 and disrupting the output signal therefrom to switch 76. It will be noted that switch 76 is already receiving a continuouus input signal from the circuit safe or inoperative switch 72, and therefore, this removal of the signal to switch 76 from switch 77 is ineffective to open the cargo hook and jettison the cargo. When the circuit 20 is in the circuit safe or inoperative mode of operation and auto touch-down "on", a gust of wind which unloads the hook will merely serve to block vent line 70*b* of switch 70 to cause the signal therefrom to flow to switch 73 to disarm switch 73 and thereby discontinue fluid outlet flow therefrom to actuate hook loaded indicator 73. When the hook relieving gust is dissipated, switch 70 will return to its normal operation and actuate indicator 63. Such unloading will not activate switch 76 to open the hook because of the presence of the input 76*b* from BPS 72.

It will therefore be seen that when fluidic circuit 20 is in its circuit safe or inoperative mode of operation, neither pilot input nor automatic touch-down conditions can cause the load to be released by the cargo hook from the aircraft.

It should be noted that cargo hook 41 can always be manually actuated by a ground crew, even when under the control of fluidic circuit 20.

While we have described the system as controlling the cargo hook, it will be obvious to those skilled in the art that it is equally applicable to control any type of mechanism for supporting cargo from an aircraft.

FIG. 7 shows a modification of our fluidic control system and, while it performs the same function as the systems previously described, it differs therefrom in that it uses a combination of "or/nor" fluidic devices and "and" fluidic devices to perform these functions. Elements 28, 44, 56, 58, 60, 63, 64, 65, 69, 70, 71, 72, 77 and 78 are the same structurally as the devices with these reference numerals previously described. These elements operate to perform the same functions as previously described configurations. The FIG. 7 fluidic control system differs from the previously described system in that it includes digital amplifier 100, fluidic switches 73*a* and 74*a* are now of the "and" fluidic type, and fluid switch 76*a* is now of the inhibited-or fluidic type. Element 76*a* performs in the same fashion as element 76 in the earlier described circuit except that it is of the inhibited-or circuit design, rather than the or/nor circuit design. The significance of this is that so long as there is an input to switch 76*a* through line 100*a*, the system is in the "safe" mode of operation in that inputs to switch 76*a* from either switch 74*a* or 77 are ineffective to bring about cargo release through the action of interface valve 28 and cargo hook actuator 44. So that the fluidic input to 76*a* through line 100*a* is always sufficiently strong to keep switch 76*a* in a "safe" condition, digital amplifier 100, is added to the system and serves to amplify the output from switch 72 to switch 76*a* and fuel line 100*a*. This is a safety feature to insure that 76*a* remains in "safe" condition when so intended. When the circuit is "on", switch 72 is blocked so as to cause the fluidic discharge from 72 to be passed to amplifier 100 through line 72*d* so as to deactivate amplifier 100 by causing fluid discharge therefrom to be through line 100*b*, thereby making switch 76*a* an "or/nor" switch of the same type as switch 76 previously described. When the circuit switch is in the "safe" condition, switch 72 is bled, thereby causing the fluid discharge therefrom to pass to amplifier 100 through line 72*c* so as to cause the discharge from amplifier 100 to be through line 100*a*, thereby placing switch 76*a* in the aforementioned "safe" condition so that inputs thereto from either switch 74*a* or 77 are ineffective to release the cargo.

Switch 73*a* is an "and" fluidic switch and, in conventional fashion, needs two input signals thereto through lines 69*c* and 70*c* to cause the fluid therefrom to switch from outlet 73*d* to 73*e*. With respect to the operation of switch 73*a*, when the hook is loaded, switch 70 is bled so that the output from switch 70 is to switch 73*a* through outlet 70*c*. Also, since the hook is closed, switch 69 is bled and the discharge from switch 69 passes to switch 73*a* through line 69*c*, thereby causing the discharge from switch 73*a* to be to outlet 73*e* so as to energize hook loaded signal 63. When the hook is open, both switches 69 and 70 are blocked so that the discharge from each is through line 69*d* to hook open sensor 64 and to switch 78, and through line 70*d* to switch 74*a*.

With respect to the operation of switch 74*a*, it is also an "and" fluidic device like switch 73*a* so that when in the automatic touch-down mode of operation, switch 71 is blocked so that the fluid output from switch 71 is through line 71*d* to switch 74*a*. Further, when the hook is unloaded, switch 70 is blocked so that the fluid discharge from switch 70 is through line 70*d* to switch 74*a*, thereby causing the fluidic discharge from switch 74*a* to be through line 74*e* to switch 76*a* to release the cargo by opening the cargo hook. When switch 74*a* is not receiving fluidic input from switches 70 and 71, it is deactivated and its fluid discharge is through line 74*d*.

In all other respects, the modified circuit of FIG. 7 works as previously described circuit and performs the same functions thereas in the same manner except that the switched conditions of switches 69, 70, 71, 76 and 77 are reversed, and switching of switch 77 by an input signal provides an input signal to switch 76*a* in FIG. 7, rather than interrupts a signal to corresponding switch 76 in the other embodiments.

Although the invention has been shown and described with respect to preferred embodiments thereof, it should be understood by those skilled in the art that other various changes and omissions in the form and detail thereof may be made therein without departing from the spirit and the scope of the invention.

We claim:

1. A fluidically controlled cargo hook control system for aircraft in which the cargo is carried by a cargo hook supported from the aircraft including:
    A. fluidically controlled means to permit the pilot to release the cargo from the aircraft, B. fluidically controlled means to release the cargo from the aircraft automatically upon cargo touch-down, and
C. fluidically controlled means to place the cargo hook control system in a safe mode.

2. A system according to claim 1 and including fluidically controlled means to permit the pilot to override the automatic touch-down means.

3. A system according to claim 1 including fluidically controlled means to prevent the pilot control means and/or the automatic touch-down control means from overriding the control safe mode means.

4. A system according to claim 1 and including fluidically controlled means to permit the pilot to override the automatic touch-down means, and fluidically controlled means to prevent the pilot control means and/or the automatic touch-down control means to override the control safe mode means.

5. A control system according to claim 1 wherein said control system is an integrated fluidic system.

6. A control system according to claim 1 wherein said control system comprises a plurality of selectively controlled and interconnected fluidic back pressure switches and fluidic or/nor switches.

7. A system according to claim 1 and including hook loaded-unloaded condition sensor means operatively associated with said pilot control means, said automatic touch-down means and said system safe mode means.

8. A system according to claim 1 and including hook release malfunction sensor means operatively associated with said pilot controlled means and said automatic touch-down means to provide a malfunction signal when the system fails to release the cargo in response to the dictates of either of these means.

9. A system according to claim 1 wherein each of said three means is controlled from back pressure switches located in the aircraft pilot compartment.

* * * * *